Patented May 6, 1947

2,420,122

UNITED STATES PATENT OFFICE 2,420,122

SUPPRESSION OF METAL CATALYSTS

Joseph A. Chenicek, Riverside, Ill., assignor to Universal Oil Products Company, Chicago, Ill., a corporation of Delaware No Drawing. Application September 30, 1944, Serial No. 556,661

17 Claims. (Cl. 44—71)

This invention relates to a method of suppressing the deterioration of organic compounds due to the catalytic effect of metal compounds.

While the present invention is applicable to preventing such deterioration of fats, edible oils, rubber, etc., it is particularly applicable to the treatment of hydrocarbon distillates, such as cracked or polymer gasolines, and more particularly hydrocarbon distillates which have been subjected to refining in the presence of a metal. For example, in the copper sweetening process, the sweetened gasoline usually contains a relatively small amount of copper compounds which have a catalytic effect on oxidation reactions which occur when the gasoline comes in contact with air.

In a broad aspect, the present invention relates to a method of inhibiting the deterioration of an organic compound in the presence of a metal normally active to catalyze said deterioration, which comprises adding to said organic compound, in a small but sufficient amount to suppress the catalytic effect of said metal, a compound having the following general formula:

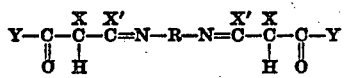

where Y represents OH, OR', NH$_2$, NHR', or NR'R', R' being an alkyl or aryl group, X and X' represent hydrogen or alkyl groups, and R is an alkylene or arylene group to which the nitrogen atoms are attached on different carbon atoms.

In one specific embodiment the present invention relates to a method for treating gum forming hydrocarbon distillates containing metal compounds having catalytic effect on gum formation, which comprises introducing into the distillate a relatively small but sufficient quantity of ethylene-bis-(beta-imino-N-phenyl butyric acid amide) to suppress said catalytic effect of the metal compounds.

In accordance with the invention a small but sufficient quantity of the novel metal suppressor of the present invention is incorporated in the olefin-containing hydrocarbon distillate. The quantity of metal suppressor so added is usually within the range of from about 0.0001 to about 0.10% and usually is within the range of from about 0.001 to about 0.05%.

The metal suppressor of the present invention may be represented by the following general formula:

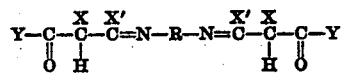

where Y represents OH, OR', NH$_2$, NHR' or NR'R', R' being an alkyl or aryl group, X and X' are hydrogen or alkyl groups, and R is an alkylene or arylene group to which the nitrogen atoms are attached on different carbon atoms.

One of the preferred metal suppressors of the present invention may be prepared by the condensation of 2 mols of aceto acetanilide with 1 mole of ethylene diamine. This condensation may readily be effected by merely mixing the two reactants and recrystallizing the precipitated condensation product. This product may be named ethylene-bis-(beta imino N-phenyl butyric acid amide) and may be represented by the following formula:

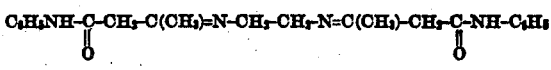

The above compound represents a suitable metal suppressor in which Y in the general formula is an NHR' group. Other suitable compounds of this group will be hereinafter discussed in detail.

When Y is an OH group, the metal suppressor of the present invention will be an alkylene- or arylene-bis-(beta-imino carboxylic acid) having at least one hydrogen atom in the alpha position, and may be represented by the following formula:

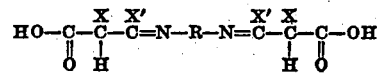

The X, X' and R are of the same grouping as hereinbefore specified for the general formula. Suitable metal suppressors falling in this classification include ethylene-bis-(beta-imino propionic acid), ethylene-bis-(beta-imino butyric acid), ethylene-bis-(beta-imino valeric acid), 1,2-propylene-bis-(beta-imino propionic acid), 1,2-propylene-bis-(beta-imino butyric acid), 1,2-propylene-bis-(beta-imino valeric acid), 2,3-butylene-bis-(beta-imino propionic acid), 2,3-butylene-bis-(beta-imino butyric acid), 2,3-butylene-bis(beta-imino valeric acid), ortho-phenylene-bis-(beta-imino propionic acid), ortho-phenylene-bis-(beta-imino butyric acid), ortho-phenylene-bis-(beta-imino valeric acid), para-phenylene-bis-(beta-imino propionic acid), para-phenylene-bis-(beta-imino butyric acid), para-phenylene-bis-(beta-imino valeric acid), etc.

When Y is an OR' group, R' being either an alkyl or aryl group, the metal suppressor of the present invention will be an alkylene- or arylene-bis-(beta-imino carboxylic acid ester) and may be represented by the following formula:

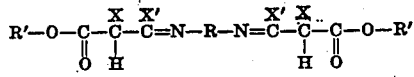

Ethylene-bis-(beta-imino butyric acid ethyl ester) may readily be prepared by the condensation of 2 mols of ethyl acetoacetate with 1 mol of ethylene diamine. Other suitable metal suppressors falling within this classification may comprise ethylene-bis-(beta-imino butyric acid methyl ester), ethylene-bis-(beta-imino butyric acid propyl ester), ethylene-bis-(beta-imino butyric acid butyl ester), ethylene-bis-(beta-imino butyric acid amyl ester), ethylene-bis-(beta imino butyric acid phenyl ester) etc. In place of ethylene in the above compounds, this grouping may be 1,2-propylene, 2,3-butylene, ortho-phenylene, etc., and in place of butyric acid, this grouping may be propionic acid, valeric acid, etc.

When Y represents an NH₂ group, the metal suppressor of the present invention will be an alkylene- or arylene-bis-(beta-imino carboxylic acid amide), and may be represented by the following formula:

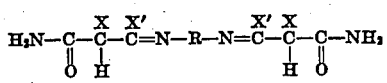

2,3-butylene-bis-(beta-imino butyric acid amide) may readily be prepared by the condensation of 2 mols of acetoacetamide with 1 mol of butylene diamine. It is understood that in place of butylene diamine, ethylene diamine, propylene diamine, amylene diamine, etc., may be used in preparing the desired metal suppressors, and also that other suitable compounds in place of acetoacetamide may be used so that the resulting compound will be the desired propionic acid amide, valeric acid amide, etc.

As heretofore set forth, one of the preferred metal suppressors of the present invention comprises the compound in which Y is an NHR' group. These compounds are alkylene- or arylene-bis-(beta-imino N-alkyl or aryl carboxylic acid amides) and may be represented by the following formula:

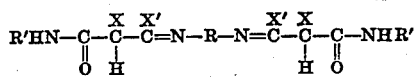

As heretofore set forth, ethylene-bis-(beta-imino N-phenyl butyric acid amide) may readily be prepared by the condensation of 2 mols of aceto acetanilide with one mol of ethylene diamine, and represents a compound of the type in which R' is a phenyl group. It is understood that other suitable compounds may be used in place of the aceto acetanilide in preparing the metal suppressor and also that other suitable diamines may be used in place of ethylene diamine.

Suitable metal suppressors in which R' is an alkyl group may be prepared, for example, by the condensation of N-ethyl-aceto acetamide with ethylene diamine, propylene diamine, butylene diamine, etc. In place of the N-ethyl aceto acetamide, N-propyl aceto acetamide, N-butyl aceto acetamide, etc., may be employed in preparing the desired metal suppressor.

When Y in the hereinbefore general formula is an NR'R' group, the metal suppressor of the present invention will be an alkylene- or arylene-bis-(beta-imino-N,N-dialkyl and/or diaryl carboxylic acid amide) and may be represented by the following formula:

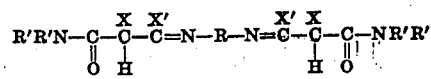

When R'R' are alkyl groups, the metal suppressor may readily be prepared by the condensation of such compounds as N-N-dimethyl aceto acetamide, N-N-di-ethyl aceto acetamide, N-N-dipropyl aceto acetamide, N-N-dibutyl aceto acetamide, etc., with a suitable alkylene diamine such as ethylene diamine, propylene diamine, butylene diamine, phenylene diamine, etc. Thus ethylene-bis-(beta-imino N,N-dimethyl butyric acid amide) may be prepared by the condensation of 2 mols of N,N-dimethyl aceto acetamide with ethylene diamine. Where R'R' are phenyl groups, ethylene-bis-(beta-imino N,N-diphenyl butyric acid amide) may readily be prepared by the condensation of N,N-diphenyl aceto acetamide with ethylene diamine, and similar metal suppressors may be prepared by proper selection of the compounds to be used as starting materials in forming the desired suppressor.

In selecting the compounds to be used as starting materials in preparing the metal suppressors, consideration should also be given to the fact that the final metal suppressor should not contain too many carbon atoms. In general it may be stated that, as the number of hydrocarbon constituents increases, the metal suppressor will become less effective. The excess hydrocarbon constituents do not enter into the reaction during the formation of the desired chelate rings in deactivating the detrimental effect of metal on the stability of the gasoline being tested. Accordingly, a higher percent of the metal suppressor would be required since the potential chelate ring formers are less for any given amount of metal suppressor. I prefer not to state any upper limit in the hydrocarbon constituents of the metal suppressor as it will vary with the different groups which Y represent. However, the present application specifies a large number of compounds which are suitable as metal suppressors and will serve as a basis for readily determining other suitable compressors. Further, it is understood that the various metal suppressors which may be prepared in accordance with the present invention are not necessarily equivalent in their activity.

The metal suppressors of the present invention are usually used in addition to inhibitors for preventing deterioration of gasolines by oxidation reactions and to prevent the loss in anti-knock value which accompanies such oxidation. Familiar oxidation inhibitors are various phenolic, amino and amino-phenolic compounds, as well as fractions of wood tar oil. In addition, it is usually the practice to add an anti-knock agent, such as tetra-ethyl lead, and also a dye to gasoline.

The function of the metal suppressor is entirely distinct from the function of the various additives recited in the preceding paragraph since, for example, the oxidation inhibitors do not suppress the catalytic action of the metals to any considerable extent and, on the other hand, the metal suppressors do not suppress oxidation reactions per se to any considerable extent but serve only to deactivate the metal compounds and thereby destroy the catalytic effect thereof to enhance the oxidation reactions.

The following examples are introduced to further illustrate the novelty and utility of the present invention, but not with the intention of unduly limiting the same.

*Example I*

The cracked gasoline used for testing had an induction period of 105 minutes. When 0.01% of an amino-phenol inhibitor was added, the induction period was increased to 375 minutes. However, when 1.2 mg. of copper per liter was added to the cracked gasoline containing 0.01% of the amino-phenol inhibitor, the induction period fell to 80 minutes. In accordance with the present invention, 0.01% of the condensation product of 2 mols of aceto acetanilide with 1 mol of ethylene diamine was added to the gasoline containing 0.01% of amino-phenol inhibitor and 1.2 mg. of copper per liter, and the induction period was increased to 390 minutes.

It is thus seen that the addition of the metal suppressor of the present invention increased the induction period of the gasoline containing copper and inhibitor from 80 minutes to 390 minutes.

*Example II*

In the treatment of the same gasoline as used in Example I, the addition of 0.01% of the condensation product of 2 mols of ethyl aceto acetate with 1 mol of ethylene diamine raised the induction period of the gasoline containing inhibitor and copper in similar quantities from 80 minutes to 345 minutes.

I claim as my invention:

1. A method of inhibiting the deterioration of hydrocarbon distillate boiling in the gasoline range in the presence of a metal normally active to catalyze said deterioration, which comprises adding to said distillate, in a small but sufficient amount to suppress the catalytic effect of said metal, a compound having the following general formula:

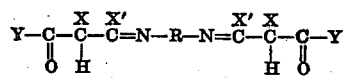

where Y is a radical selected from the group consisting of OH, OR', NH₂, NHR' and NR'R', R' being a radical selected from the class consisting of alkyl and aryl groups, X and X' being selected from the class consisting of hydrogen and alkyl groups, and R is a radical selected from the class consisting of alkylene and arylene groups, the nitrogen atoms of said compound being attached to different carbon atoms of R.

2. A method of inhibiting the deterioration of hydrocarbon distillate boiling in the gasoline range in the presence of a metal normally active to catalyze said deterioration, which comprises adding to said distillate compound a small but sufficient quantity of an alkylene bis-(beta-imino N-phenyl carboxylic acid amide), to suppress the catalytic effect of said metal.

3. A method of inhibiting the deterioration of hydrocarbon distillate boiling in the gasoline range in the presence of a metal normally active to catalyze said deterioration, which comprises adding to said distillate compound a small but sufficient quantity of ethylene bis-(beta-imino N-phenyl butyric acid amide) to suppress the catalytic effect of said metal.

4. A method of inhibiting the deterioration of hydrocarbon distillate boiling in the gasoline range in the presence of a metal normally active to catalyze said deterioration, which comprises adding to said distillate compound, a small but sufficient amount of an alkylene-bis-(beta-imino carboxylic acid amide) to suppress the catalytic effect of said metal.

5. A method of inhibiting the deterioration of hydrocarbon distillate boiling in the gasoline range in the presence of a metal normally active to catalyze said deterioration, which comprises adding to said distillate compound a small but sufficient quantity of 2,3-butylene-bis-(beta-imino butyric acid amide) to suppress the catalytic effect of said metal.

6. A method of inhibiting the deterioration of hydrocarbon distillate boiling in the gasoline range in the presence of a metal normally active to catalyze said deterioration, which comprises adding to said distillate compound a small but sufficient quantity of an alkylene-bis-(beta-imino carboxylic acid ester) to suppress catalytic effect of said metal.

7. A method of inhibiting the deterioration of hydrocarbon distillate boiling in the gasoline range in the presence of a metal normally active to catalyze said deterioration, which comprises adding to said distillate compound a small but sufficient quantity of ethylene-bis-(beta-imino butyric acid ethyl ester) to suppress said catalytic effect of said metal.

8. A method of inhibiting the deterioration of a cracked gasoline distillate in the presence of a metal normally active to catalyze said deterioration, which comprises adding to said distillate, in a small but sufficient amount to suppress the catalytic effect of said metal, a compound having the following general formula:

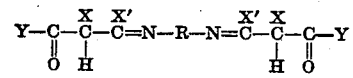

where Y is a radical selected from the group consisting of OH, OR', NH₂, NHR' and NR'R', R' being a radical selected from the class consisting of alkyl and aryl groups, X and X' being selected from the class consisting of hydrogen and alkyl groups, and R is a radical selected from the class consisting of alkylene and arylene groups, the nitrogen atoms of said compound being attached to different carbon atoms of R.

9. A method for treating gum forming motor fuel containing a metal compound having a catalytic effect on gum formation, which comprises incorporating into the motor fuel a relatively small but sufficient quantity to suppress said catalytic effect of the metal compound, a compound having the following general formula:

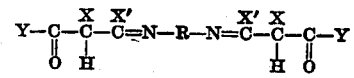

where Y is a radical selected from the group consisting of OH, OR', NH₂, NHR' and NR'R', R' being a radical selected from the class consisting of alkyl and aryl groups, X and X' being selected from the class consisting of hydrogen and alkyl groups, and R is a radical selected from the class consisting of alkylene and arylene groups, the nitrogen atoms of said compound being attached to different carbon atoms of R.

10. A method for treating cracked gasoline containing a metal compound having a catalytic effect on gum formation which comprises incorporating into the cracked gasoline a relatively small but sufficient quantity of ethylene-bis-(beta-imino N-phenyl butyric acid amide) to suppress the catalytic effect of said metal.

11. A method for treating cracked gasoline containing a metal compound having a catalytic effect on gum formation which comprises incorporating into the cracked gasoline a relatively small but sufficient quantity of 2,3-butylene-bis-(beta-imino butyric acid amide) to suppress the catalytic effect of said metal.

12. A method for treating cracked gasoline containing a metal compound having a catalytic effect on gum formation which comprises incorporating into the cracked gasoline a relatively small but sufficient quantity of ethylene-bis-(beta-imino butyric acid ethyl ester) to suppress said catalytic effect of said metal.

13. Motor fuel comprising gasoline containing a metal compound normally active to catalyze deterioration of the gasoline and additionally containing, as a suppressor of said catalytic action, a compound having the following general formula:

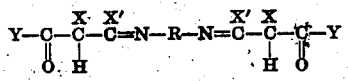

where Y is a radical selected from the group consisting of OH, OR′, NH₂, NHR′ and NR′R′, R′ being a radical selected from the class consisting of alkyl and aryl groups, X and X′ being selected from the class consisting of hydrogen and alkyl groups, and R is a radical selected from the class consisting of alkylene and arylene groups, the nitrogen atoms of said compound being attached to different carbon atoms of R.

14. Motor fuel comprising gum-forming cracked gasoline containing a metal compound having a catalytic effect on gum formation and additionally containing, as a suppressor of said catalytic effect, about 0.0001 to about 0.1% of a compound having the following general formula:

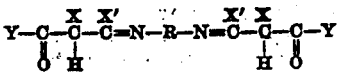

where Y is a radical selected from the group consisting of OH, OR′, NH₂, NHR′ and NR′R′, R′ being a radical selected from the class consisting of alkyl and aryl groups, X and X′ being selected from the class consisting of hydrogen and alkyl groups, and R is a radical selected from the class consisting of alkylene and arylene groups, the nitrogen atoms of said compound being attached to different carbon atoms of R.

15. Motor fuel comprising cracked gasoline containing a metal compound having a catalytic effect on gum formation and additionally containing, as a suppressor of said catalytic effect, about 0.001 to about 0.05% of ethylene-bis-(beta-imino N-phenyl butyric acid amide).

16. Motor fuel comprising cracked gasoline containing a metal compound having a catalytic effect on gum formation and additionally containing, as a suppressor of said catalytic effect, about 0.001 to about 0.05% of 2,3-butylene-bis-(beta-imino butyric acid amide).

17. Motor fuel comprising cracked gasoline containing a metal compound having a catalytic effect on gum formation and additionally containing, as a suppressor of said catalytic effect, about 0.001 to about 0.05% of ethylene-bis-(beta-imino butyric acid ethyl ester).

JOSEPH A. CHENICEK.

REFERENCES CITED

The following references are of record in the file of this patent:

UNITED STATES PATENTS

| Number | Name | Date |
|---|---|---|
| 2,312,082 | Dietrich | Feb. 23, 1943 |